US008255988B2

(12) United States Patent
Carpenter

(10) Patent No.: US 8,255,988 B2
(45) Date of Patent: Aug. 28, 2012

(54) DIRECT PERIPHERAL COMMUNICATION FOR RESTRICTED MODE OPERATION

(75) Inventor: Todd L. Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 11/692,237

(22) Filed: Mar. 28, 2007

(65) Prior Publication Data

US 2008/0238612 A1 Oct. 2, 2008

(51) Int. Cl.
  *G06F 7/04* (2006.01)
  *G06F 7/00* (2006.01)
  *G06F 12/00* (2006.01)
  *G06F 12/14* (2006.01)
  *G06F 13/00* (2006.01)
  *G06F 17/30* (2006.01)
  *G06F 3/00* (2006.01)
  *G06F 21/00* (2006.01)
  *H04L 29/06* (2006.01)
(52) U.S. Cl. ............... 726/17; 710/5; 713/185; 713/159
(58) Field of Classification Search .................. 726/2, 5, 726/6, 16, 17; 712/245, 246, 220; 710/1, 710/5, 6, 7, 8; 713/185, 159
  See application file for complete search history.

(56) References Cited

U.S. PATENT DOCUMENTS

| 5,898,888 | A | 4/1999 | Guthrie et al. |
| 5,937,063 | A | 8/1999 | Davis |
| 6,061,794 | A | 5/2000 | Angelo et al. |
| 6,209,098 | B1 | 3/2001 | Davis |
| 6,633,981 | B1 * | 10/2003 | Davis ............................. 713/189 |
| 6,704,871 | B1 | 3/2004 | Kaplan et al. |
| 7,028,132 | B2 | 4/2006 | Riley |
| 7,117,376 | B2 | 10/2006 | Grawrock |
| 7,844,808 | B2 * | 11/2010 | Westerinen et al. ............. 713/1 |
| 8,151,115 | B2 * | 4/2012 | Depta ........................... 713/185 |
| 2002/0147920 | A1 * | 10/2002 | Mauro .......................... 713/200 |
| 2004/0153672 | A1 | 8/2004 | Watt et al. |
| 2004/0210906 | A1 | 10/2004 | Beresnevichiene et al. |
| 2004/0236874 | A1 * | 11/2004 | Largman et al. .................. 710/8 |
| 2004/0268135 | A1 * | 12/2004 | Zimmer et al. ............... 713/189 |
| 2005/0033969 | A1 | 2/2005 | Kiiveri et al. |
| 2005/0160159 | A1 * | 7/2005 | Zimmer et al. ............... 709/223 |
| 2005/0283826 | A1 | 12/2005 | Tahan |
| 2005/0289343 | A1 | 12/2005 | Tahan |
| 2006/0005019 | A1 * | 1/2006 | Chao ............................. 713/166 |
| 2006/0023883 | A1 | 2/2006 | Konetski et al. |
| 2006/0059372 | A1 | 3/2006 | Fayar et al. |
| 2006/0090084 | A1 | 4/2006 | Buer |

(Continued)

OTHER PUBLICATIONS

International Search Report for PCT/US2008/057057 mailed Jul. 28, 2008.

(Continued)

*Primary Examiner* — Edan Orgad
*Assistant Examiner* — Jahangir Kabir

(57) ABSTRACT

A computer that self-administers operating in restricted and unrestricted operating modes boots from a main processor and operates normally in the unrestricted operating mode and operates from an alternate processor in a security module in the restricted operating mode. The alternate processor may communicate directly with peripheral devices such as a display controller and keyboard. Because the main processor is not used and may not even be started in the restricted operating mode, viruses, shims, and other related attacks are virtually eliminated. In one embodiment, the security module may operate as a PCI bus master when in the restricted operating mode.

18 Claims, 3 Drawing Sheets

U.S. PATENT DOCUMENTS

| | | | |
|---|---|---|---|
| 2006/0129848 | A1 | 6/2006 | Paksoy et al. |
| 2006/0179487 | A1* | 8/2006 | Hatakeyama .................. 726/26 |
| 2007/0113266 | A1 | 5/2007 | Ross et al. |
| 2007/0192580 | A1* | 8/2007 | Challener et al. ................ 713/2 |

OTHER PUBLICATIONS

Written Opinion for PCT/US2008/057057 mailed Jul. 28, 2008.

Anderson et al., "Cryptographic Processors—A Survey," http://www.it.iitb.ac.in/~annanda/micro-payment/selected-papers/Survey.pdf.

Mayhew et al., "PCI Express and Advanced Switching: Evolutionary Path to Building Next Generation Interconnects," IEEE 2003, http://ieeexplore.ieee.org/iel5/8712/27585/01231473.pdf?isNumber=.

Coburn et al., "SECA: Security-Enhanced Communication Architecture," ACM 2005, http://delivery.acm.org/10.1145/1090000/1086308/p78-coburn.pdf?key1=1086308&key2=1381251711&coll=ACM&dl=ACM&CFID=75919783&CFTOKEN=92791909.

* cited by examiner

DIRECT PERIPHERAL COMMUNICATION FOR RESTRICTED MODE OPERATION

BACKGROUND

In many cases, it is desirable to restrict the operation of a computer to known modes. For example, a parent may wish to restrict gaming time while allowing word processing. In another example, a company may wish to limit the use of an expensive peripheral, such as a 3-D printer, to only authorized users. In another example, a pay-per-use computer may have an unlimited use mode when the terms of an associated contract are satisfied and a restricted use mode that only allows input of additional usage time or points when terms of the associated contract are not met.

In the latter case, a low, subsidized, initial price of a computer may require a contractual obligation to recoup an underwriters investment. Because contractual terms may have already been intentionally disregarded, a user may be inclined to attempt to defeat or evade the restricted use mode. Doing so may allow the user to enjoy the benefits of the computer without meeting contractual terms, such as payment of monthly subscription fees, to the detriment of the underwriter.

SUMMARY

A computer may be required to self-administer a restricted-use mode when a user is able to isolate the computer from other means of sanctioning, such as a computer network or Internet Service Provider (ISP). Therefore, the circuitry involved in the restricted use mode can be expected to attract hacking attempts by unscrupulous users. An attack profile for defeating restricted mode operation is directly related to the number of components that are active, particularly those involved in enforcing such operation. The attack profile may be dramatically reduced when a security module used for metering and enforcement acts as a bus master, for example, on a peripheral component interconnect (PCI) bus, to directly communicate with a limited number of required components. For example, a security module may directly control a display interface and keyboard controller to provide a minimal user interface to allow entry of data to restore full services.

By avoiding use of the computer's main processor, main memory disk drives, other chipset components, etc., most conventional attacks, such as buffer overflow attacks or memory swapping, are immediately eliminated. Even though the security module may become the focus of attacks, this also allows a design and manufacturing focus on protection of the security module rather than trying to protect every hardware and software aspect of the computer. The security module may be a standalone component or may be integrated into a communication or processing circuit, such as one of the chipset components common in known computer architectures.

The use of pre-boot direct device communication may be used to in many embodiments. In one embodiment, basic user interface and communication functions may be supported without intervention from a main processor of the computer. In another embodiment, the direct device communication may be used in conjunction with system checks verify the security and health of the computer. Following such checks, the direct device communication may be used to unlock those same components for normal operation supporting a normal boot process with a standard basic input/output system (BIOS).

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
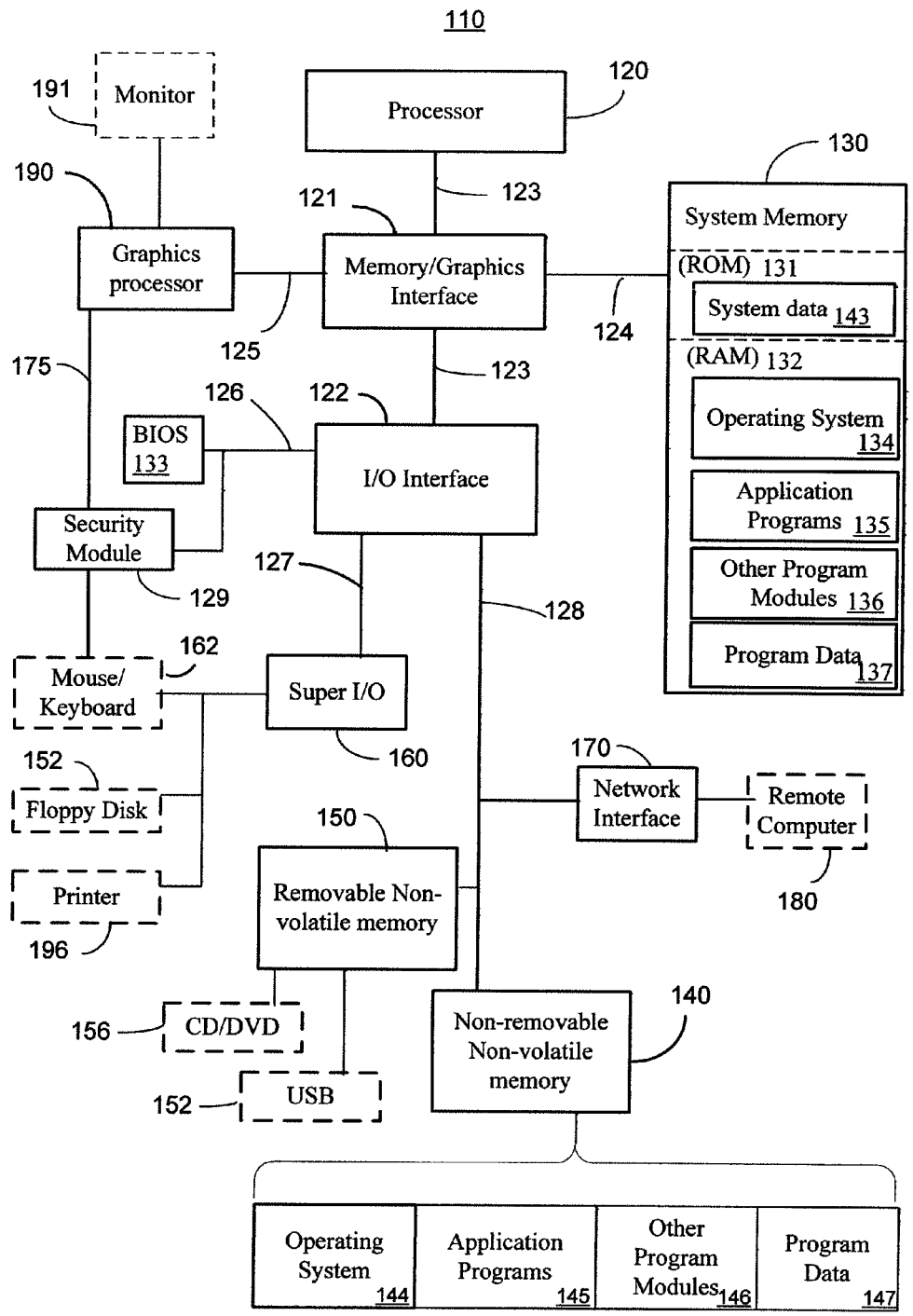
FIG. 1 is a simplified and exemplary block diagram of a computer system suitable for use with peer-to-peer communication for secure operation.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a main processor 120, a system memory 130, a memory/graphics interface 121, also known as a Northbridge chip, and an I/O interface 122, also known as a Southbridge chip. A memory 130 and a graphics processor 190 may be coupled to the memory/graphics interface 121. A monitor 191 or other graphic output device may be coupled to the graphics processor 190.

A series of system busses may couple various these system components including a high speed system bus 123 between the main processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 121 may be any of several types of bus structures including, by way of examples and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by main processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 128 may connect to a basic input/output system (BIOS) memory 133 containing the basic routines that help to transfer information between elements within computer 110, such as during startup.

A security module 129 may also be coupled to the I/O controller 122 via the SPI bus 126. In other embodiments, the security module 129 may be connected via any of the other busses available in the computer 110. In a pay-per-use business model, the security module 129 may meter usage, support booting from a known BIOS, and monitor compliance to metering-related policies. When tampering or other suspicious behavior is observed that may indicate attempts to circumvent pay-per-use operation, the security module 129 may sanction the computer by forcing operation in a limited function mode.

A super input/output chip 160 may be used to connect to a number of 'legacy' peripherals, such as floppy disk 152, keyboard/mouse 162, and printer 196, as examples. The super I/O chip 122 may be connected to the I/O interface 121 with a low pin count (LPC) bus, in some embodiments. The super I/O chip is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection depicted in FIG. 1 may include a local area network (LAN), a wide area network (WAN), or both, but may also include other networks. Such networking environments are commonplace in offices, enterprise-wide computer networks, intranets and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
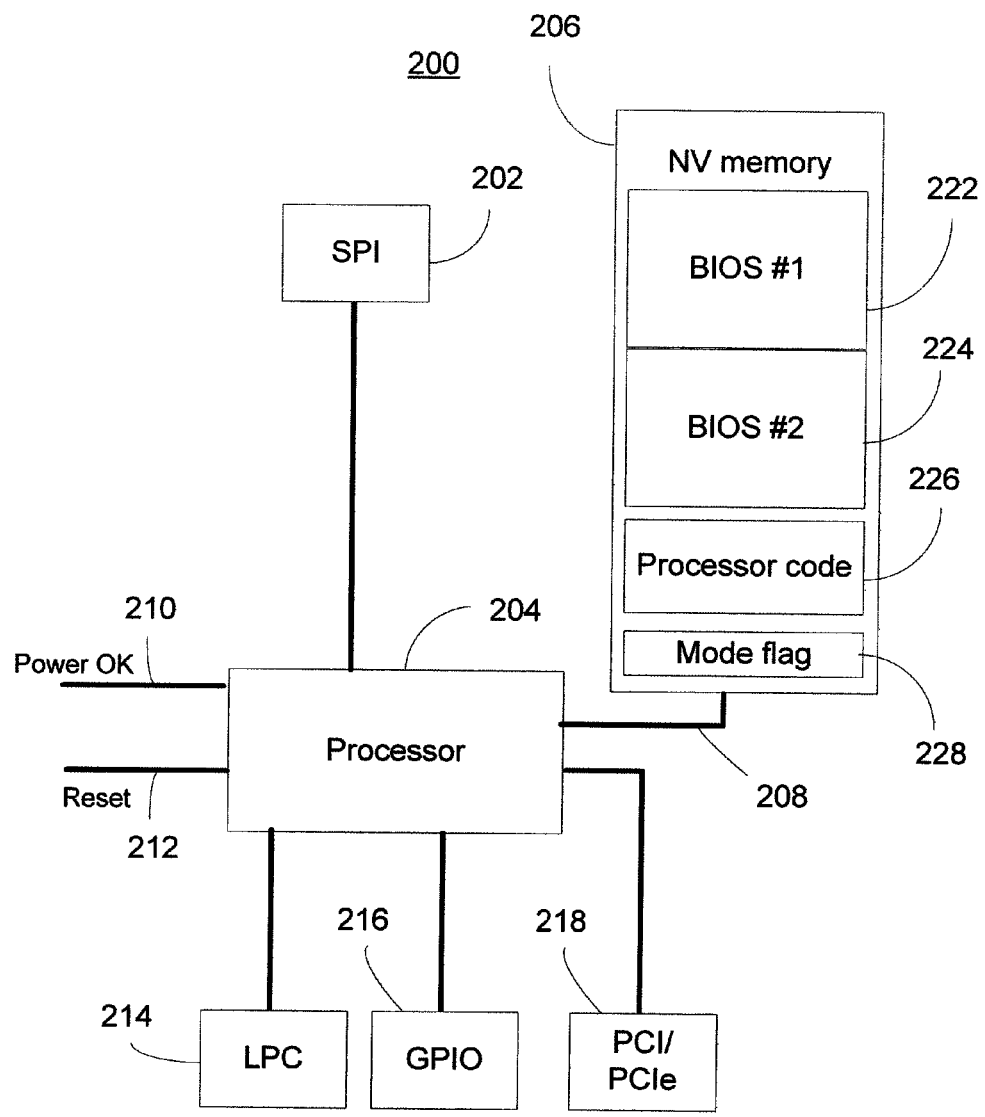
FIG. 2 is a simplified and exemplary block diagram of a security module.

FIG. 2 depicts a security module 200, similar to the security module 129 of FIG. 1. The exemplary embodiment of the security module 200 is but one example of a security module suitable for use in this application. The security module 200 may be a standalone component. In other embodiments, the security module 200 may be incorporated in another component, for example, a chipset component such as the I/O interface 122. The I/O interface 122 is strategically located on each of the major system busses and allows almost transparent access to most of the major systems and components of a computer as shown in FIG. 1.

The security module 200 may have several functions. One function may be to represent the interests of an underwriter with a financial stake in the computer by requiring that the underwriter's contractual terms are met. Those terms may include payment for use of the computer in the form of a subscription or metered usage time. The security module 200 may include metering circuitry (not depicted) and a memory for saving stored value. The security module 200 may or may not have integrated BIOS memory.

The security module 200 may also include circuitry and applications associated with its second function of enforcing a limited function mode of operation when the contractual terms are not met. The goal of the limited, or restricted, mode of operation is to deny the user beneficial use of the computer while supporting enough functionality to restore normal operation by updating the subscription or adding resources to the stored value balance. The use of direct communication for restricted mode operation may be one aspect of this enforcement function. As shown in FIG. 2, a serial peripheral interface (SPI) 202 may be coupled to a processor 204 and a nonvolatile memory 206. The SPI interface 202 may be connected to an SPI master device, such as I/O interface 122 of FIG. 1. In one embodiment, the processor 204 may be coupled to the nonvolatile memory 206 via a bus 208 that may be another serial peripheral interface or another kind of memory bus. In another embodiment, the SPI interface 202 may connect to both the processor and the nonvolatile memory 206.

The processor 204 may be coupled to other exemplary bus interfaces such as an low pin count (LPC) interface 214, a general purpose input/output (GPIO) interface 216, or a PCI interface 218. In other embodiments, more or fewer busses may be connected to the processor 204. The nonvolatile memory 206 may include partitions for a first BIOS 222, a second BIOS 224, as well as executable processor code 226 used by the processor 204. A mode flag 228 may provide a secure way of persisting the operating state of the computer, that is, restricted or unrestricted, following the next reset.

A power OK pin 210 may be used to monitor or set a signal indicating that the power supply is stable. As will be discussed, this signal may also be used to selectively disable some circuits. A reset output 212 may be used by the processor 204 to cause an interruption in operation of a computer incorporating the security device 200, such as computer 110 of FIG. 1.

The processor 204 may be a single-chip processor such as an ARM processor from ARM Ltd of Cambridge, UK, although similar processors from Intel and Freescale Semiconductor are also available. The nonvolatile memory 206 may be a flash technology device widely available in the commercial marketplace.

In operation, when reset activity is detected, for example, when a Power OK signal 210 transitions from inactive to active, the processor 204 may read the mode flag 228 to determine how to start the computer 110. If the mode flag indicates normal operation, the processor 204 may allow access to a BIOS designated for normal operation, for example, BIOS 222. However, when the mode flag 228 indicates operation is to be in the restricted mode, the processor 204 may block access to the normal boot BIOS and may instead cause the computer 110 to boot from a secondary BIOS 224. The secondary BIOS 224 may not activate all the functions of the computer 10. In one embodiment, the BIOS 224 is code only used by the processor 204 or a link to the processor code 226. In this embodiment, with operation designated in the restricted mode, the processor 204 may take over operation of the computer 110.

In order to accomplish this, the processor 204, responsive to executable commands in the alternate BIOS 224 or processor code 226, may create a direct link to various peripheral devices needed for minimal functionality. Such minimal functionality may include access to the graphics controller 190 to enable output to the monitor 191 and to the keyboard/mouse 162, either directly or through the Super I/O chip 160. Minimal functionality may also include a direct connection to the network interface 170 for communication with a remote computer 180, or to access a network accessible user input device, such as a terminal (not depicted).

Direct connection does not necessarily mean without any intervening circuitry but rather is intended to denote that data is passed without any intervention or activity on part of the main processor 120. Because the main processor 120 is bypassed, the associated peripherals, firmware, and software associated with activating and operating the main processor 120 are also unnecessary and may also be bypassed or not even started. The degree to which the main processor 120 and other devices, such as disk drives, the Northbridge, etc. are not activated is a design decision, but each boot activity from a normal boot that is not performed, contributes to lowering the overall attack profile of the computer 110.

The smallest possible attack profile may then be provided by only activating the minimal number of components required to conditions for unrestricted operation. In one embodiment, the minimal number of components may be use of enough of the display 191 to support a prompt and enough of an input capability, such as keyboard/mouse 162 to support entry of an unlock code or provisioning packet. Other useful peripherals for entry of provisioning information may be removable media such as floppy disk 152, CD/DVD 156, or USB port 152 to support a flash drive. Connection to remote computer 180 via network interface 170 may also provide access to restoration data such as a provisioning packet.

Not starting the main processor 120 also implies that any attack targeted at the operating system 134 or applications 135, including viruses, would be not be effective, since the OS 134 and applications 135 are not activated.

In one embodiment that disables the main processor 120, the processor 204 may have Power OK output 210 connected to a Power OK input (not depicted) on the main processor 120. When the processor 204 determines that operation is to be in the restricted operation mode, the Power OK output 210 may be reset, causing the main processor to not start, or if operating, to cease operation, as if the power were shutting down. Other circuits that respond to the Power OK signal may be similarly disabled when the processor 204 determines operation in the restricted mode. For example, a non-removable non-volatile memory controller 140, such as a disk controller, may be prevented from starting when operation is in the restricted mode by controlling the Power OK signal.

After determining that the computer 110 is to be operated in the restricted mode, the direct link may be established between the security module 200 and another peripheral or peripheral controller, such as graphics processor 190. The security module 200 may operate as a bus master when communicating over the PCI bus 128. Operation as a PCI bus master allows the security module 200 perform known control functions to select a target component from among connected PCI devices and carry on bidirectional communication with the targeted component. When other busses are used, appropriate controls and protocols may be used. For example, even though the protocol may dictate certain signal levels and timing, the message traffic may follow other standard formats such as XML, to allow standardization and convenience for development, debugging, and maintenance of inter-component messaging.

Another risk for restricted mode operation may be substitution of components, either to try to circumvent control by the security module 200 or to strip parts from the computer for resale. Both of these threats may be addressed by cryptographic verification that the correct components are present and functional, or at least functional enough to respond to a challenge issued by the security module 200. While in a secure manufacturing environment, or in another trusted setting, components installed in the computer may be given secret keys that can be used for one-way or mutual verification. Such mutual verification between the security module 200 and other components may be performed as part of each boot, only when tampering is suspected, when in the restricted operating mode, or a combination of these.

Figure 3:
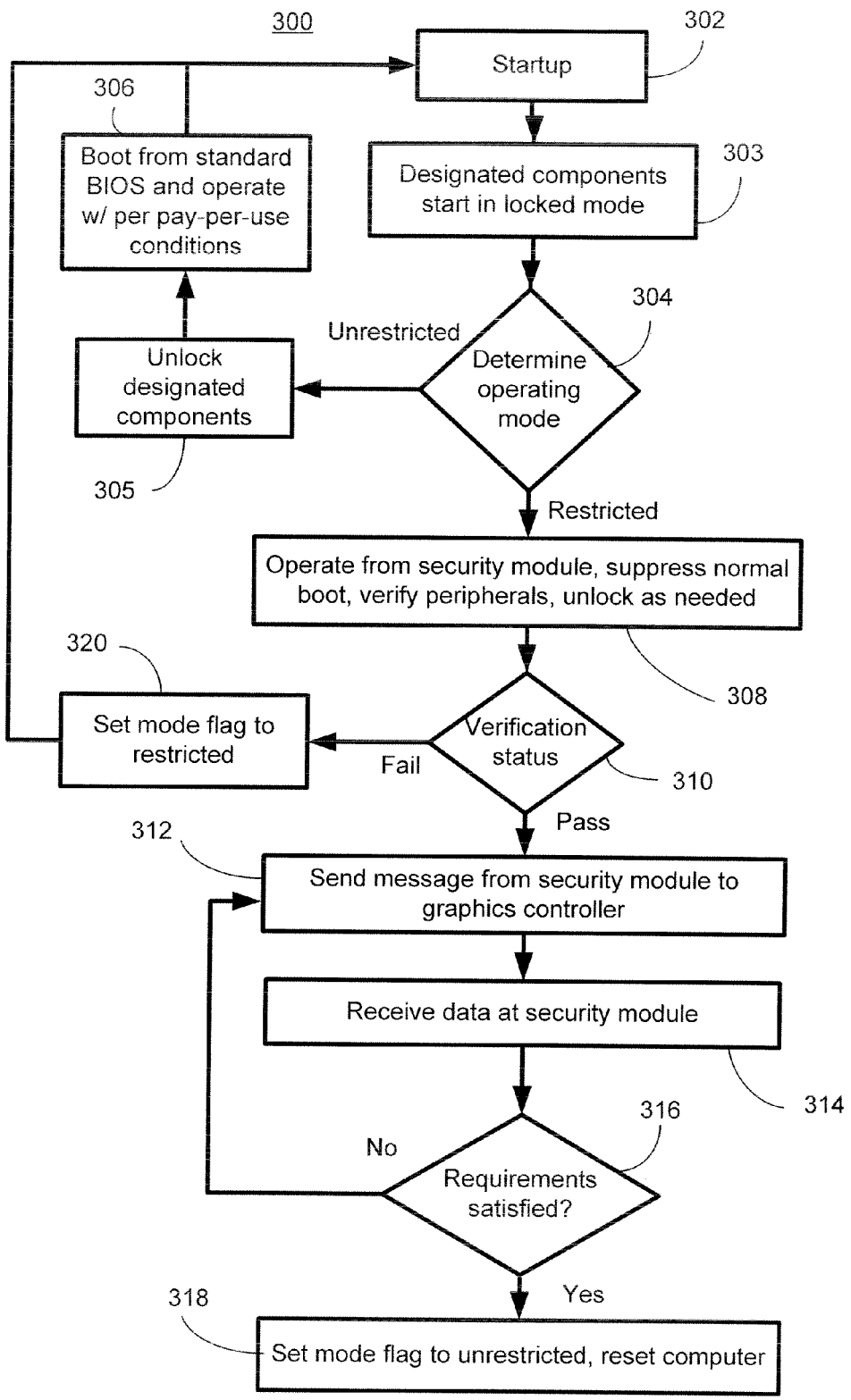
FIG. 3 is a flow chart of an exemplary method of executing peer-to-peer communication for secure operation.

FIG. 3, a method of using peer-to-peer communication for secure operation of a computer, is discussed and described. At block 302, when a computer, such as computer 110 of FIG. 1, is started, an early process may activate a security module, such as security module 129 of FIG. 1. Optionally, at block 303, certain components may be designated to start in a locked mode. The locked mode setting of components such as the I/O interface 122, the memory/graphics interface 121, the network interface 170, the processor 120, etc., may further hinder attempts to bypass security measures taken at startup. Components started in the locked mode may support normal operating functions after being unlocked by the security module 129.

At block 304, the security module 129 may determine whether the computer should be activated in a normal, unrestricted operating mode or a restricted operating mode. This determination may be made by checking the state of a memory location, such as mode flag 228 of FIG. 2. A flag value of zero may indicate normal operation and a flag value of one may indicate restricted operation. As mentioned above, the goal of restricted operation is to limit use of the computer to only those functions required to bring the computer back into compliance with contractual terms of operation, e.g. updating a subscription end date or adding usage time to a stored value balance in the security module 129.

When, at block 304, the determination is made that operation should be in the unrestricted mode, the "unrestricted" branch from block 304 may be taken to block 305. If the component locking function at block 303 was active, at block 305 an unlock message may be sent to each of those components previously locked. A single message may be broadcast to each component on a single bus or a series of independent messages may be sent to each locked component. In one embodiment a security module 200 may hold the power OK line 210 to the processor 120 until all components acknowledge being unlocked, at which point the power OK line 120 may be released and the processor 120 can begin a normal boot sequence. At block 306, the security module 129 may allow booting from a standard BIOS and for operation to proceed under normal conditions, that may include usage metering and tamper monitoring. If, during the course of operation, conditions change, such as a metering balance going to zero, the mode flag 228 may be set and a reset forced on the computer 110 to send operation back to block 302.

When, at block 304, the determination is made that a condition exists that indicates operation in a restricted mode, such as the mode flag 228 being set or a zero stored value balance, the "restricted" branch from block 304 may be taken to block 308. At block 308, the security module 129 may block execution of the normal boot process. In one embodiment, the security module 129 may block access to the normal boot BIOS 222 and instead use the security module's own internal processor 204 to support the restricted mode operation operating from an alternate BIOS 224 or from executable code 226 used for the security module's normal execution. If, at block 303, components were started in the locked mode, those components required for restricted operation may be unlocked. For example, the memory/graphics interface 121 and the network interface 170 may be unlocked as needed.

Part of the restricted mode operation may include verification of one or more peripheral devices through a cryptographic challenge response function. For example, the security module 129 may send an encrypted nonce to a graphics processor 190 and receive back the decrypted nonce and an encrypted device identifier. If, at block 310, the peripheral device verification passes, the past branch from block 310 may be taken to block 312.

At block 312, the security module 129 may send a message, and some embodiments an encrypted message, to the graphics controller 190 or another device capable of supporting user interface, such as a TDD hearing impaired interface (not depicted). The message may prompt a user to enter an unlock code or token, such as a flash disk, to recover from the condition that caused operation in the restricted mode. In some cases the token may be available via the network interface 170 from a remote device, such as remote computer 180. In such a circumstance the network interface 170 may be activated and controlled directly from the security module 129.

At block 314, the security module 129 received a requested data and at block 316 determine if the data is sufficient to allow restoration of full operation. If so, the "yes" branch from block 316 may be taken to block 318 where the mode flag 228 may be cleared, or otherwise set to unrestricted, and the computer may be reset, for example by activating the reset output 212 of the security module 129. In another embodiment, components locked at block 303 may be unlocked and operation may continue through a normal boot. If, at block 316 the data does not satisfy the requirements for restoration of operation, the "no" branch from block 316 may be taken to block 312 and the user prompted to reenter the unlock code or other restoration data.

At block 310, if the peripheral device verification fails, indicating physical tampering with the device or a catastrophic failure, the user may not be allowed to enter an unlock code. There may be little or no reason to allow a user to try to restore normal operation to a computer that is either damaged or intentionally tampered because subsequent operation may not support accurate metering or other security monitoring. Execution may follow the "failed" branch from block 310 to block 320 where the mode flag 228 may be set (or re-set) to the restricted mode of operation and the computer forced into a reset returning execution to block 302.

By disabling virtually all the major functions of a computer by bypassing a main processor and using a secondary processor to support direct, encrypted communication between the secondary processor and selected peripheral devices, the risk of overriding a restricted operating mode may be significantly reduced. Such a strategy may offer a significant incentive to potential underwriters to support a pay-per-use business model. Because the execution environment for the restricted mode operation is almost completely separate from that of normal operation, the likelihood of an easily propagated attack, such as through scripting, can also be lowered significantly.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical if not impossible. Numerous alternative embodiments could be implemented, using either current technology or technology developed after the filing, date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

I claim:

1. An electronic device adapted to use an unrestricted mode of operation and a restricted mode of operation, the electronic device comprising:
    a first processor coupled to a system bus and used to operate the computer in the unrestricted mode of operation;
    a controller coupled to the first processor; and
    a security module comprising:
        a second processor to operate the computer in the restricted mode of operation;
        a secondary bus connected between the security module and the controller, the secondary bus separate from the system bus and allowing the security module to manage direct communication with the controller without involvement of the first processor;
        storage storing a mode setting flag, a first program executable by the second processor, and a second program executable by the first processor, wherein whenever the computer reboots the security module first locks components of the computer and then checks the mode setting flag to determine if the computer is to operate in the restricted mode of operation or the unrestricted mode of operation, and according to the determining:
            when the mode setting flag indicates the restricted mode of operation one of the components is unlocked and the second program is executed by the second processor, the second program sends a message to the controller requesting user to provide a unlock code or a token;
            when user enter a unlock code or a token, or provide from a removable memory or from a remote computer through a network interface, received data in response to the message is determined to be sufficient to allow restoration of full operation, the second program sets the flag to indicate the unrestricted mode of operation and reboots the computer, wherein the message is sent and the response is verified while the computer operates in the restricted mode with at least one of the components remaining locked; and
            when the mode setting flag indicates the unrestricted mode of operation all of the locked components are unlocked and the computer boots using the first program executing on the first processor, wherein while the computer operates in the unrestricted mode a condition change causes the mode setting flag to be set to the restricted mode of operation and the computer is rebooted.

2. The electronic device of claim 1, wherein the security module directly communicates with an input device for receiving data at the security module.

3. The electronic device of claim 1, wherein the security module directly communicates with a network interface.

4. The electronic device of claim 1, wherein the controller comprises a display controller.

5. The electronic device of claim 1, wherein the security module further comprises a power-okay pin and a power management function that disables operation of the first processor according to the power-okay pin.

6. The electronic device of claim 1, wherein the condition change comprises a detection of tampering with the electronic device.

7. A method of operating a computer having a limited function mode and full function mode comprising:
    performing a first reboot of the computer, the computer comprising non-volatile memory, the non-volatile memory comprising a flag that controls whether the computer is in the full function mode or in the limited function mode, the computer further comprising a main processor, a controller, and a security module, the security module comprising a secondary processor and storage storing a first BIOS program and a second BIOS program;
    after the first reboot of the computer, locking one or more designated components of the computer;
    after the first reboot of the computer, reading, by the security module, the flag in the non-volatile memory and determining from the flag that the computer is to operate in the limited function mode, and in response executing the second BIOS program by the secondary processor and unlocking at least one of the locked components, the computer then operating in the limited function mode with at least one of the components remaining locked;
    while operating in the limited function mode, sending, by the second BIOS program, a message under the control of the second BIOS program from the security module to the controller causing a prompt to be displayed, requesting user to provide a unlock code or a token;

while operating in the limited function mode, when user enter a unlock code or a token, or provide from a removable memory or from a remote computer through network interface, receiving entered the unlock code or the token, or provided from a removable memory or from a remote computer through a network interface, in response to the prompt by the security module via the second BIOS program;

while operating in the limited function mode, determining by the second BIOS program that the received data is determined to be sufficient to allow restoration of full operation, setting the flag in the non-volatile memory in the security module to a value that indicates the computer is to operate in the full function mode of operation and then performing a second reboot of the computer;

after the second reboot of the computer, locking one or more of the components and then determining that the flag is set to the full function mode of operation and in response unlocking all of the one or more locked components and executing the first BIOS program stored in the security module; and during operation of the computer in the full function mode, in response to detection of a condition change setting the flag to indicate that the computer is to operate in the limited function mode and forcing a third reboot of the computer.

8. The method of claim 7, further comprising encrypting the message.

9. The method of claim 7, further comprising exchanging a cryptographic verification from each of a predetermined set of the components at the security module.

10. The method of claim 9, further comprising resetting the computer when the cryptographic verification of at least one of the predetermined set of the components fails.

11. The method of claim 7, further comprising:
reading the flag in the non-volatile memory indicating that operation is to be in the full function mode; and
sending an unlock message from the security module to at least one of the components prior to a normal boot cycle.

12. The method of claim 7, wherein the data is received from either an input device, a removable media, or a network interface controller.

13. The method of claim 7, wherein the one of the components comprises a user interface input device and the method further comprises directly receiving the data from the user interface input device.

14. The method of claim 7, wherein the components comprise peripheral devices including a network interface controller and the method further comprises directly communicating with a remote entity via the network interface controller.

15. The method of claim 7, further comprising activating direct communication between the secondary processor and one of the components and cryptographically verifying an identity of the component.

16. The method of claim 7, further comprising booting from the main processor when no condition exists requiring the computer to operate in the limited function mode.

17. The method of claim 7, wherein the condition change comprises expiration of a metered time of operation.

18. The method of claim 7, wherein the condition change comprises detection of tampering with the electronic device.

* * * * *